No. 780,963. PATENTED JAN. 24, 1905.
A. M. STARR.
INSECT DESTROYER.
APPLICATION FILED SEPT. 1, 1903.

Witnesses
Georgia E. Cilley
C. V. Cilley

Inventor
Albertus M. Starr
By Ithiel J. Cilley
Attorney

No. 780,963. Patented January 24, 1905.

UNITED STATES PATENT OFFICE.

ALBERTUS M. STARR, OF GRAND RAPIDS, MICHIGAN, ASSIGNOR OF ONE-HALF TO JOHN F. BRADISH, OF GRAND RAPIDS, MICHIGAN.

INSECT-DESTROYER.

SPECIFICATION forming part of Letters Patent No. 780,963, dated January 24, 1905.

Application filed September 1, 1903. Serial No. 171,556.

*To all whom it may concern:*

Be it known that I, ALBERTUS M. STARR, a citizen of the United States, residing at Grand Rapids, in the county of Kent and State of Michigan, have invented certain new and useful Improvements in Insect-Destroyers, of which the following is a specification.

My invention relates to improvements in implements for gathering and destroying potato-bugs; and its objects are, first, to provide an implement that will readily and rapidly brush the bugs from the potato-vines without injury to the vines; second, to provide for passing over the vines without danger of cutting them down with the wheels of the implement, and, third, to provide an implement that may be readily adjusted to different heights of vines. I attain these objects by the mechanism illustrated in the accompanying drawings, in which—

Figure 1:
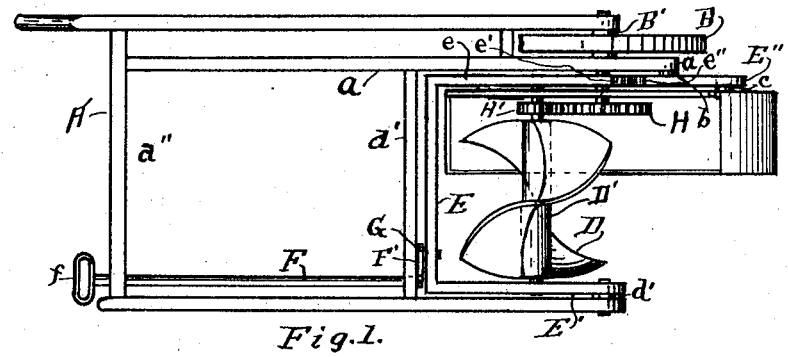
Figure 2:
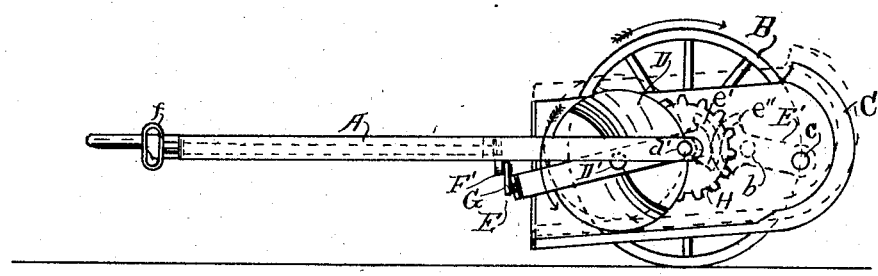
Figure 3:
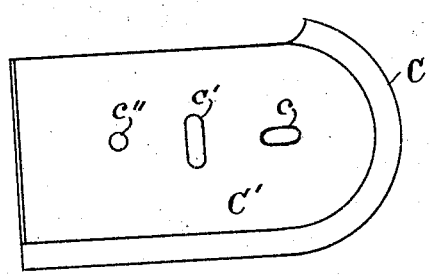
Figure 4:
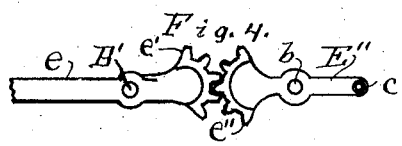

Figure 1 is a plan of the implement. Fig. 2 is a side elevation of the same. Fig. 3 is a side elevation of the collecting-pan detached from the frame, and Fig. 4 is a side elevation of the pan-actuating yoke and lever.

Similar letters refer to similar parts throughout the several views.

A represents the frame of the implement, and B represents the wheel by which it is propelled. It will be seen that I use but one wheel. This is for two purposes—first, I can run close to a large hill of potatoes without danger of running the wheel over and cutting off the vines, as might occur with two wheels; second, with but one wheel I can tip the opposite side of the frame down toward the ground or raise it up from the ground, and thus give a variation of height to the shaker D to meet almost any height of vine.

The wheel B is revolubly secured to the frame A upon the shaft B', which passes through the beam $a$, the arm $e$ of the yoke E, which is pivotally secured thereon, and through the slot $c'$ in the side of the pan C, and supports and revolves the gear-wheel H as the implement is pushed along over the ground.

The yoke E is formed of three sides, the back portion E, the arm $e$, that is pivoted upon the shaft, and the arm E', which is pivoted to the opposite side of the frame, as indicated at $d'$, directly in line with the shaft B', so that the yoke E may be made to reciprocate vertically, and the shaft D', carrying the auger-shaped collector-wings D, is revolubly supported in the arms E' and $e$ some distance back of the pivot-points B' and $d'$, so that the raising or lowering of the back end of the yoke will raise and lower the collector-wings D to meet the varying height of the potato-vines. This is accomplished by the use of the revoluble rod F, which is supported by passing through the girths $a'$ and $a''$ and has a right-angled lever F' attached to the lower end, which is connected by the connecting-rod G with the bar E of the yoke, so that when the handle $f$ of the rod F is in the position indicated in Fig. 2 the yoke, and with it the pan C, will be thrown down to the lowest point (indicated in Fig. 2) and when the handle $f$ is in the position shown in Fig. 1, where the lever F' is thrown up parallel with the girth $a'$, the yoke, and with it the pan C, will be raised to the position indicated by the dotted lines in Fig. 2.

The pan C is supported as follows: The arm $e$ of the yoke has a geared segment $e'$ at the end, and the arm E'', pivoted to the beam $a$, as at $b$, has a corresponding geared segment $e''$, that meshes therewith, so that when the back end of the yoke E is raised or lowered the end of the arm E'' is raised or lowered in the same direction. The pan C is secured to the arm $e$ by the shaft D' passing through the hole $c''$ and the arm E'' by the pin and hole indicated at $c$ and is provided with a slotted aperture $c'$, through which the shaft B' passes, and the pan may have considerable vertical motion, so that when the end F of the yoke is raised or lowered by the handle $f$ and rod F the pan and the collector-shaft and wings will raise or lower uniformly and correspondingly. To compensate for the varying distance between the shaft D' and the outer end of the arm E'', I elongate the hole $c$ in the side of the pan to allow the pin in the end of the arm E'' to move therein.

The shaft D' is provided with a small gear-wheel H', that meshes with the gear-wheel H, so that when the wheel B moves in the direction of the arrow above it in Fig. 2 the collector-fans D will be made to revolve much faster and in the opposite direction, as indicated by the arrow over them in Fig. 2, so that the wings are made to revolve under toward the vines they are approaching, and the worm or auger form of the wings draws the vines and bugs over into the pan and drops the bugs into the pan behind the wall C'.

The action of this machine is as follows: When pushing the machine over the rows of potatoes, the outer or right-hand end of the auger-shaped shaker D engages the tops of the vines, and the revolving of the shaker under toward the vines draws the vines toward the inner or right-hand corner of the auger-shaped shaker D and immediately over the pan C, where it leaves the shaker with a sudden motion, which shakes the bugs off the vines into the pan, whence they may be readily destroyed as the operator may elect.

Having thus fully described my invention, what I claim as new, and desire to secure by Letters Patent of the United States, is—

1. In an insect-destroyer, a supporting-frame and wheel, a vertically-adjustable pan supported in said frame and worm-shaped rotary wings adjacent thereto, substantially as and for the purpose set forth.

2. In an insect-destroyer, a supporting-frame and wheel and a wheel-shaft, a gear-wheel attached to said shaft, an adjustable yoke pivoted to said frame and having a geared segment at one end of one arm, a short arm pivoted to the frame and having a geared segment engaging the segment upon the yoke-arm, a pan secured to the yoke-arm and the short arm, and an adjusting rod and lever supported in the frame and connected with the yoke, a shaft supported in the yoke back of its pivotal connection with the frame, a geared wheel on said shaft engaging the geared wheel on the wheel-shaft, and worm-shaped wings secured upon the shaft, substantially as and for the purpose set forth.

3. In an insect-destroyer, the combination with a supporting-frame and wheel of a pan secured to the frame and a revoluble shaft carrying worm-shaped wings, substantially as and for the purpose set forth.

Signed at Grand Rapids, Michigan, August 29, 1903.

ALBERTUS M. STARR.

In presence of—
C. V. CILLEY,
ITHIEL J. CILLEY.